US008559458B2

(12) United States Patent
Maas et al.

(10) Patent No.: US 8,559,458 B2
(45) Date of Patent: Oct. 15, 2013

(54) METHOD AND APPARATUS FOR UPLINK SCHEDULING IN AN ORTHOGONAL FREQUENCY DIVISION MULTIPLEXING COMMUNICATION SYSTEM

(75) Inventors: David R. Maas, Hoffman Estates, IL (US); Chen Mu, Hoffman Estates, IL (US)

(73) Assignee: Motorola Mobility LLC, Libertyville, IL (US)

( * ) Notice: Subject to any disclaimer, the term of this patent is extended or adjusted under 35 U.S.C. 154(b) by 640 days.

(21) Appl. No.: 12/472,458

(22) Filed: May 27, 2009

(65) Prior Publication Data

US 2010/0303022 A1 Dec. 2, 2010

(51) Int. Cl.
*H04J 3/16* (2006.01)
(52) U.S. Cl.
USPC ............... 370/468; 455/452.2; 709/226
(58) Field of Classification Search
None
See application file for complete search history.

(56) References Cited

U.S. PATENT DOCUMENTS

| 5,752,193 | A | * | 5/1998 | Scholefield et al. | ....... 455/452.2 |
| 7,623,451 | B2 | | 11/2009 | Lee et al. | |
| 2006/0105773 | A1 | * | 5/2006 | Lin et al. | ............ 455/452.1 |
| 2008/0075027 | A1 | | 3/2008 | Lee et al. | |
| 2008/0080378 | A1 | * | 4/2008 | Kim et al. | ............ 370/234 |
| 2008/0081378 | A1 | | 4/2008 | Ramel | |
| 2008/0259860 | A1 | * | 10/2008 | Ohseki et al. | ............ 370/329 |
| 2009/0207791 | A1 | * | 8/2009 | Nakatsugawa | ............ 370/329 |
| 2009/0268756 | A1 | * | 10/2009 | Frantz | ............ 370/468 |

FOREIGN PATENT DOCUMENTS

WO 9709836 3/1997

OTHER PUBLICATIONS

KIPO'S Notice of Preliminary Rejection, (English Translation), May 27, 2011, all pages.

* cited by examiner

*Primary Examiner* — Yemane Mesfin
*Assistant Examiner* — Khoa Huynh (57) ABSTRACT

A method and scheduler are provided that optimize utilization of an uplink (UL) data packet field of an UL sub-frame. In one embodiment, a request for an allocation of bandwidth is received from each of multiple mobile stations. The requests include requests for a bandwidth allocation of a first size range and requests for a bandwidth allocation of a second size range, wherein each request of the second size range requests more bandwidth than any request of the first size range. Bandwidth is allocated in a UL data packet field to the requests in order of priority, and when the allocated bandwidth does not fill the UL data packet field and a request of the second size range remains unallocated, an allocation of bandwidth to an unallocated request of the second size range is substituted for an allocation of bandwidth to a request of the first size range.

8 Claims, 6 Drawing Sheets

METHOD AND APPARATUS FOR UPLINK SCHEDULING IN AN ORTHOGONAL FREQUENCY DIVISION MULTIPLEXING COMMUNICATION SYSTEM

FIELD OF THE INVENTION

The present invention relates generally to Orthogonal Frequency Division Multiplexing (OFDM) communication systems, and, in particular, to uplink scheduling in an OFDM communication system.

BACKGROUND OF THE INVENTION

The IEEE (Institute of Electrical and Electronics Engineers) 802.16 standards propose using Orthogonal Frequency Division Multiple Access (OFDMA) for transmission of data over an air interface. OFDMA has also been proposed for use in 3GPP (Third Generation Partnership Project) Evolution communication systems. In an OFDMA communication system, a frequency bandwidth is split into multiple contiguous frequency sub-bands, each sub-band comprising multiple sub-carriers over a given number of OFDM symbols, that are transmitted simultaneously. A user may then be assigned one or more of the frequency sub-bands for an exchange of user information, thereby permitting multiple users to transmit simultaneously on the different sub-carriers.

Figure 1:
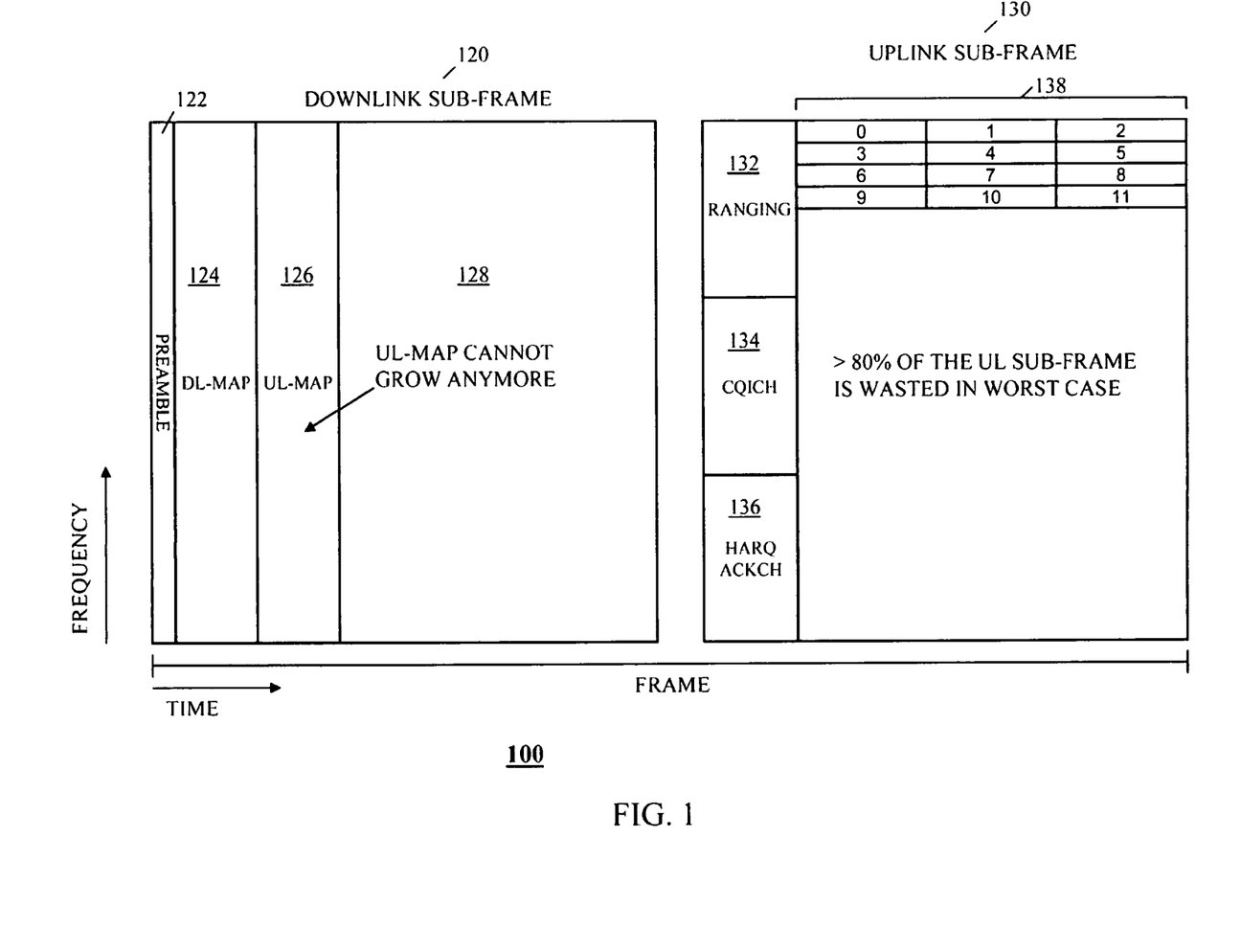
FIG. 1 is a block diagram of an exemplary WiMAX frame of the prior art.

In order to inform a user, that is, a user's mobile station (MS), of the one or more frequency sub-bands assigned to the user for an uplink transmission, a serving Radio Access Network (RAN) identifies the assignment in a downlink sub-frame that is transmitted to the MS. For example, FIG. 1 is a block diagram of an exemplary frame 100, and in particular a WiMAX frame, of prior art. As depicted in FIG. 1, frame 100 comprises a downlink (DL) sub-frame 120 that is sent by a RAN to users served by the RAN and an uplink (UL) sub-frame 130 that is sent by users to the RAN.

DL sub-frame 120 includes a DL scheduling field (DL-MAP) 124, an UL scheduling field (UL-MAP) 126, and a DL data packet field 128. DL sub-frame 120 further may include a preamble field 122. DL-MAP 114 provides a frame duration, a frame number, a DL sub-band allocation for DL bursts, and a coding and modulation scheme used for each DL burst. UL-MAP 116 provides UL sub-band scheduling for UL bursts by served mobile stations (MSs), a coding and modulation scheme used for each UL burst, and a start time for each UL burst. DL data packet field 128 comprises the DL bursts, that is, is the field in which the RAN transmits data packets to the served MSs based on the sub-band scheduling. Preamble field 122 typically comprises pilots that may be used by MSs for timing synchronization, frequency synchronization, and channel estimation.

UL sub-frame 130 includes a control region comprising a Ranging Code field 132, a channel quality information (CQI) feedback field 134 (that is, CQI channels (CQICH)), and a Hybrid Automatic Repeat reQuest (HARQ) acknowledgement field 136 (that is, HARQ Acknowledgement channels (HARQ ACKCH)). UL sub-frame 130 further comprises an UL data packet field 138. UL data packet field 138 comprises UL bursts, that is, is the field in which the MSs transmit data packets to the RAN based on UL-MAP 126. A location of an MS's data packet in UL data packet field 138, that is, the sub-bands(s) (sub-carriers and times) used by the MS to transmit data, is determined by the assignment received by the MS in UL-MAP 126.

One embodiment of a typical WiMAX communication system is to have a fixed UL-MAP size, such as 100 bytes. Typically, UL-MAPs and DL-MAPs are heavily encoded, and providing scheduling information to an MS requires a non-trivial number of bytes. As a result, when among the MSs being scheduled are many MSs merely requiring a small uplink bandwidth allocation, the size of the UL-MAP can constrain frame utilization, that is, can cause less than full use of the UL data packet field. This is particularly a problem for the UL-MAP where any MS with Best Effort traffic can request a data packet channel allocation, that is, an allocation of one or more sub-bands in UL data packet field 138.

That is, in order to request a data packet channel allocation, an MS randomly picks a Ranging Code and a symbol and conveys this to the RAN in the Ranging Code field 132 of a DL-sub-frame. The Ranging Code and symbol are anonymous and the MS then looks for this Ranging Code and symbol, in association with a bandwidth allocation, in a subsequent UL sub-frame from the RAN. When the RAN gets the Ranging Code, the RAN allocates UL bandwidth, that is, sub-band(s) in UL data packet field 138, to the MS for the purpose of permitting the MS to identify itself and request bandwidth for a particular connection. The RAN then informs the MS, via UL-MAP 126 of an UL sub-frame, of the bandwidth allocated to the MS in UL data packet field 138 for identification and bandwidth request purposes. In response to receiving the allocation, the MS then sends a Bandwidth Request Header, in the allocated sub-band(s) in UL data packet field 138, that requests bandwidth for a particular connection.

The Bandwidth Request Header is a small-size allocation that typically consumes only six to eight bytes. Other similarly small allocations of bandwidth include polls, for example, for a real time polling service (rtPS) or a non-real time polling service (nrtPS), which may occur as often as every 20 milliseconds (ms). When the RAN is engaged in a large enough number of such pollings and/or other small-size bandwidth requests, the UL-MAP 116 can fill up allocating bandwidth to such small bandwidth requests. This can result in a corresponding under utilization of an UL data packet field 138 of a subsequent UL sub-frame.

For example, with an UL-MAP size of 100 bytes and a single slot Code Division Multiple Access (CDMA) information element (IE) comprising eight bytes, the UL-MAP 126 can be completely filled with 12 small bandwidth allocations, whereas Best Effort bandwidth requests also may have been received from some larger bandwidth users. As a result, the RAN may allocate bandwidth in an UL data packet field of an UL sub-frame, such as UL data packet field 138 of an UL sub-frame 130, to 12 small bandwidth users. These 12 users then respectively transmit back to RAN in allocated sub-bands 0-11 of the UL data packet field. A result is that as much as 80% of the UL data packet field is left empty and correspondingly is wasted.

Therefore, a need exists for a method and apparatus that schedules an UL sub-frame in a manner that better utilizes the sub-bands of the UL data packet field.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION OF THE INVENTION

To address the need for a method and an apparatus that that schedules an uplink (UL) sub-frame in a manner that better utilizes the sub-bands of the UL data packet field, a scheduler is provided that assures a fuller utilization of a UL data packet field of a UL sub-frame than in the prior art. In one embodiment, the scheduler receives, from each mobile station of multiple mobile stations, and stores a request for an allocation of bandwidth, wherein the requests comprise one or more requests for a bandwidth allocation of a first size range and one or more requests for a bandwidth allocation of a second size range and wherein each bandwidth allocation request of the second size range requests more bandwidth than any bandwidth allocation request of the first size range. The scheduler allocates bandwidth in a UL data packet field of a UL sub-frame to the bandwidth allocation requests in order of priority and when the allocated bandwidth does not fill the UL data packet field and one or more bandwidth allocation requests of the second size range remains unallocated, substitutes an allocation of bandwidth to an unallocated bandwidth allocation request of the second size range for an allocation of bandwidth to a bandwidth allocation request of the first size range. In another embodiment of the present invention, the scheduler employs threshold values and a table in making such allocations.

Generally, an embodiment of the present invention encompasses a method for uplink scheduling in an Orthogonal Frequency Division Multiplexing (OFDM) communication system. The method includes receiving, from each mobile station (MS) of multiple mobile stations (MSs), a request for an allocation of bandwidth, wherein the requests comprise one or more requests for a bandwidth allocation of a first size range and one or more requests for a bandwidth allocation of a second size range and wherein each bandwidth allocation request of the second size range requests more bandwidth than any bandwidth allocation request of the first size range. The method further includes allocating bandwidth in a UL data packet field of a UL sub-frame to the bandwidth allocation requests in order of priority and, when the allocated bandwidth does not fill the UL data packet field and one or more bandwidth allocation requests of the second size range remains unallocated, substituting an allocation of bandwidth to an unallocated bandwidth allocation request of the second size range for an allocation of bandwidth to a bandwidth allocation request of the first size range in the UL data packet field.

Another embodiment of the present invention encompasses a method for uplink scheduling in an OFDM communication system. The method includes receiving, from each MS of multiple MSs, a request for an allocation of bandwidth, wherein the requests comprise one or more requests are for a bandwidth allocation of a first size range and one or more requests are for a bandwidth allocation of a second size range and wherein each bandwidth allocation request of the second size range requests more bandwidth than any bandwidth allocation request of the first size range. The method further includes determining a number of registered MSs in a coverage area and determining a maximum number of bandwidth allocation requests of the first size range that can be scheduled for a UL data packet field of a UL sub-frame based on the determined number of registered MSs in the coverage area.

Yet another embodiment of the present invention encompasses a scheduler operable in an OFDM communication system The scheduler includes an at least one memory device and a processor that is configured to receive, from each MS of multiple MSs, and store in the at least one memory device, a request for an allocation of bandwidth, wherein the requests comprise one or more requests for a bandwidth allocation of a first size range and one or more requests for a bandwidth allocation of a second size range and wherein each bandwidth allocation request of the second size range requests more bandwidth than any bandwidth allocation request of the first size range, allocate bandwidth in a UL data packet field of a UL sub-frame to the bandwidth allocation requests in order of priority, and when the allocated bandwidth does not fill the UL data packet field and one or more bandwidth allocation requests of the second size range remains unallocated, substitute an allocation of bandwidth to an unallocated bandwidth allocation request of the second size range for an allocation of bandwidth to a bandwidth allocation request of the first size range in the UL data packet field.

Still another embodiment of the present invention encompasses a scheduler operable in an OFDM communication system. The scheduler includes an at least one memory device and a processor that is configured to receive, from each MS of multiple MSs, and store in the at least one memory device, a request for an allocation of bandwidth, wherein the requests comprise one or more requests are for a bandwidth allocation of a first size range and one or more requests are for a bandwidth allocation of a second size range and wherein each bandwidth allocation request of the second size range requests more bandwidth than any bandwidth allocation request of the first size range, determine a number of registered MSs in a coverage area, and determine a maximum number of bandwidth allocation requests of the first size range that can be scheduled for a UL data packet field of a UL sub-frame based on the determined number of registered MSs in the coverage area.

Figure 2:
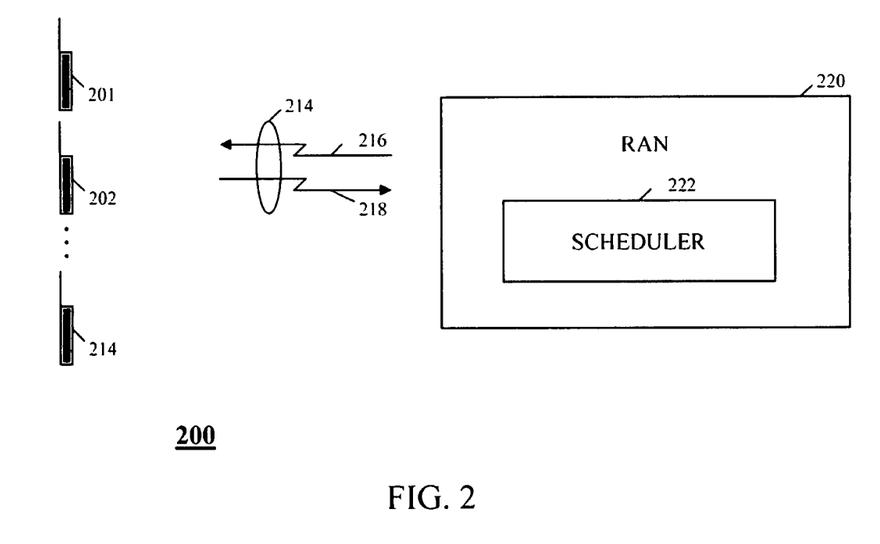
FIG. 2 is a block diagram of a wireless communication system in accordance with an embodiment of the present invention.

The present invention may be more fully described with reference to FIGS. 2-7. FIG. 2 is a block diagram of a wireless communication system 200 in accordance with an embodiment of the present invention. Communication system 200 includes multiple mobile stations (MSs) 201-214 (fourteen depicted), such as but not limited to a cellular telephone, a radio telephone, a personal digital assistant (PDA), laptop computer, or personal computer with radio frequency (RF) capabilities, or a wireless modem that provides RF access to digital terminal equipment (DTE) such as a laptop computer. Communication system 200 further includes a Radio Access Network (RAN) 220 that provides communication services to users equipment, such as MSs 201-214, residing in a coverage area of the RAN via an air interface 214.

RAN 220 includes one or more transceivers (not shown), such as a Node B or a Base Transceiver Station (BTS), in wireless communication with each MS, such as MS 202, serviced by the RAN and further includes an access network controller (not shown), such as a Radio Network Controller (RNC) or a Base Station Controller (BSC), coupled to the one or more transceivers. RAN 220 further includes a packet scheduler 222 that performs the scheduling functions described herein as being performed by the RAN. In various embodiments of the invention, scheduler 222 may be implemented in the transceiver or the controller of RAN 220, or scheduler 222 may be a separate module coupled to each of the transceiver and the controller. Air interface 214 comprises a downlink 216 and an uplink 218. Each of downlink 216 and uplink 218 comprises multiple physical communication channels, including multiple control channels and multiple traffic channels.

Figure 3:
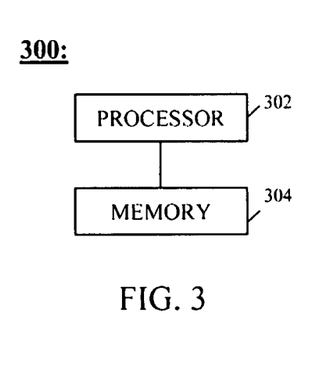
FIG. 3 is a block diagram of a mobile station of the communication system of FIG. 2 in accordance with an embodiment of the present invention.

FIG. 3 is a block diagram of an MS 300, such as MSs 201-214, in accordance with an embodiment of the present invention. MS 300 includes a processor 302, such as one or more microprocessors, microcontrollers, digital signal processors (DSPs), combinations thereof or such other devices known to those having ordinary skill in the art. The particular operations/functions of processor 302, and thus of MS 300, is determined by an execution of software instructions and routines that are stored in a respective at least one memory device 304 associated with the processor, such as random access memory (RAM), dynamic random access memory (DRAM), and/or read only memory (ROM) or equivalents thereof, that store data and programs that may be executed by the corresponding processor.

Figure 4:
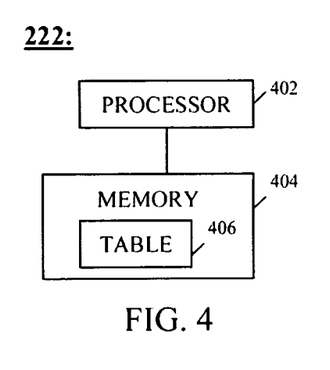
FIG. 4 is a block diagram of a scheduler of the communication system of FIG. 2 in accordance with an embodiment of the present invention.

FIG. 4 is a block diagram of scheduler 222 in accordance with an embodiment of the present invention. Scheduler 222 includes a processor 402, such as one or more microprocessors, microcontrollers, digital signal processors (DSPs), combinations thereof or such other devices known to those having ordinary skill in the art. The particular operations/functions of processor 402, and respectively thus of scheduler 222, are determined by an execution of software instructions and routines that are stored in an at least one memory device 404 associated with the processor, such as random access memory (RAM), dynamic random access memory (DRAM), and/or read only memory (ROM) or equivalents thereof, that store data and programs that may be executed by the corresponding processor. At least one memory device 404 of scheduler 222 may further maintain a table 406 listing a maximum number of small-size bandwidth allocations, for example, allocations of six to ten bytes, as a function of the number of registered MSs being served in a covered area, such as a cell or a sector, associated with the scheduler. In various embodiments of the present invention, when scheduler 222 is implemented in the transceiver or the controller of RAN 220, processor 402 may be the processor of the implementing network element and at least one memory device 404 may be a corresponding memory device of the implementing network element.

The embodiments of the present invention preferably are implemented within MSs 201-214 and scheduler 222, and more particularly with or in software programs and instructions stored in the respective at least one memory device 304, 404 and executed by respective processors 302, 402 of the MSs and scheduler. However, one of ordinary skill in the art realizes that the embodiments of the present invention alternatively may be implemented in hardware, for example, integrated circuits (ICs), application specific integrated circuits (ASICs), and the like, such as ASICs implemented in one or more of MSs 201-214 and scheduler 222. Based on the present disclosure, one skilled in the art will be readily capable of producing and implementing such software and/or hardware without undo experimentation.

Communication system 200 comprises a wideband packet data communication system that employs an Orthogonal Frequency Division Multiplexing (OFDM) modulation scheme for transmitting data over air interface 214. Preferably, communication system 200 is an Orthogonal Frequency Division Multiple Access (OFDMA) communication system, wherein a frequency bandwidth employed by the communication system is split into multiple frequency sub-bands, or Resource Blocks (RBs), during a given time period. Each sub-band comprises multiple orthogonal frequency sub-carriers over a given number of OFDM symbols, that are the physical layer channels over which traffic and signaling channels are transmitted in a TDM or TDM/FDM fashion. The channel bandwidth also may be sub-divided into one or more sub-band groups, or Resource Block Groups (RBGs), wherein each sub-band group comprises one or more sub-bands that may or may not be contiguous, and the sub-band groups may or may not be of equal size. A communication session may be assigned one or more sub-bands or sub-band groups for an exchange of bearer information, thereby permitting multiple users to transmit simultaneously on the different sub-bands such that each user's transmission is orthogonal to the other users's transmissions.

In addition, communication system 200 preferably comprises a Worldwide Interoperability for Microwave Access (WiMAX) communication system that operates in accordance with the IEEE (Institute of Electrical and Electronics Engineers) 802.16 standards, which standards specify wireless telecommunications system operating protocols, including radio system parameters and call processing procedures. However, those who are of ordinary skill in the art realize that communication system 200 may operate in accordance with any wireless telecommunication system employing an Orthogonal Frequency Division Multiplexing (OFDM) modulation scheme, such as a 3GPP (Third Generation Partnership Project) E-UTRA (Evolutionary UMTS Terrestrial Radio Access) communication system, a 3GPP2 (Third Generation Partnership Project 2) Evolution communication system, for example, an Ultra Mobile Broadband (UMB) communication system, a Wireless Local Area Network (WLAN) communication system as described by the IEEE 802.xx standards, for example, the 802.11a/HiperLAN2, 802.11g, or 802.20 standards, or any of multiple proposed ultrawideband (UWB) communication systems.

In order for RAN 220, and more particularly scheduler 222, to selectively schedule multiple MSs, such as MSs 201-214, served by the RAN and that have submitted a bandwidth request, for use of one or more sub-bands of a frequency bandwidth employed by communication system 200, RAN 220 provides the requesting MSs, via an uplink (UL) scheduling field (UL-MAP) of an UL sub-frame, with scheduling information for a scheduling period. The scheduling information may include, for example, a reference start time, preferably in units of radio frames such as a starting Cell System Frame Number (SFN) index or a starting Connection Frame Number (CFN) index, a scheduling duration, that is, a duration of a time period during which the provided scheduling information is applicable, for example, in units of radio frames or Transmission Time Intervals (TTIs), and an allocated one or more sub-bands. Further, when a large number of MSs are requesting bandwidth for a variety of applications of varying bandwidth requirements but of a same priority, scheduler 222 may reprioritize one or more of the larger bandwidth requests in order to optimize utilization of an UL data packet field of an UL sub-frame.

Figure 5A:
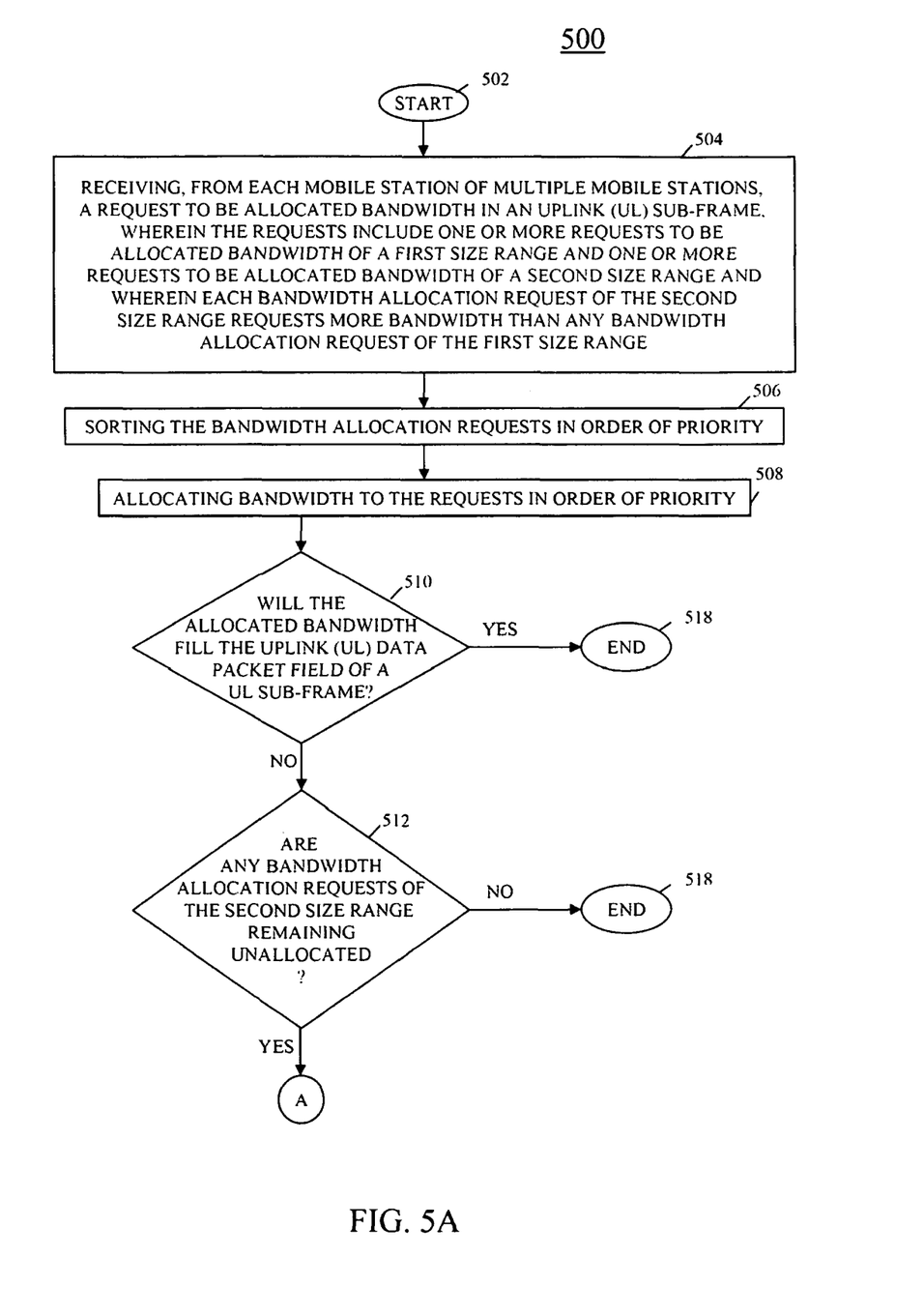
FIG. 5A is a logic flow diagram illustrating a method for uplink scheduling performed by the communication system of FIG. 2 in accordance with an embodiment of the present invention.
Figure 5B:
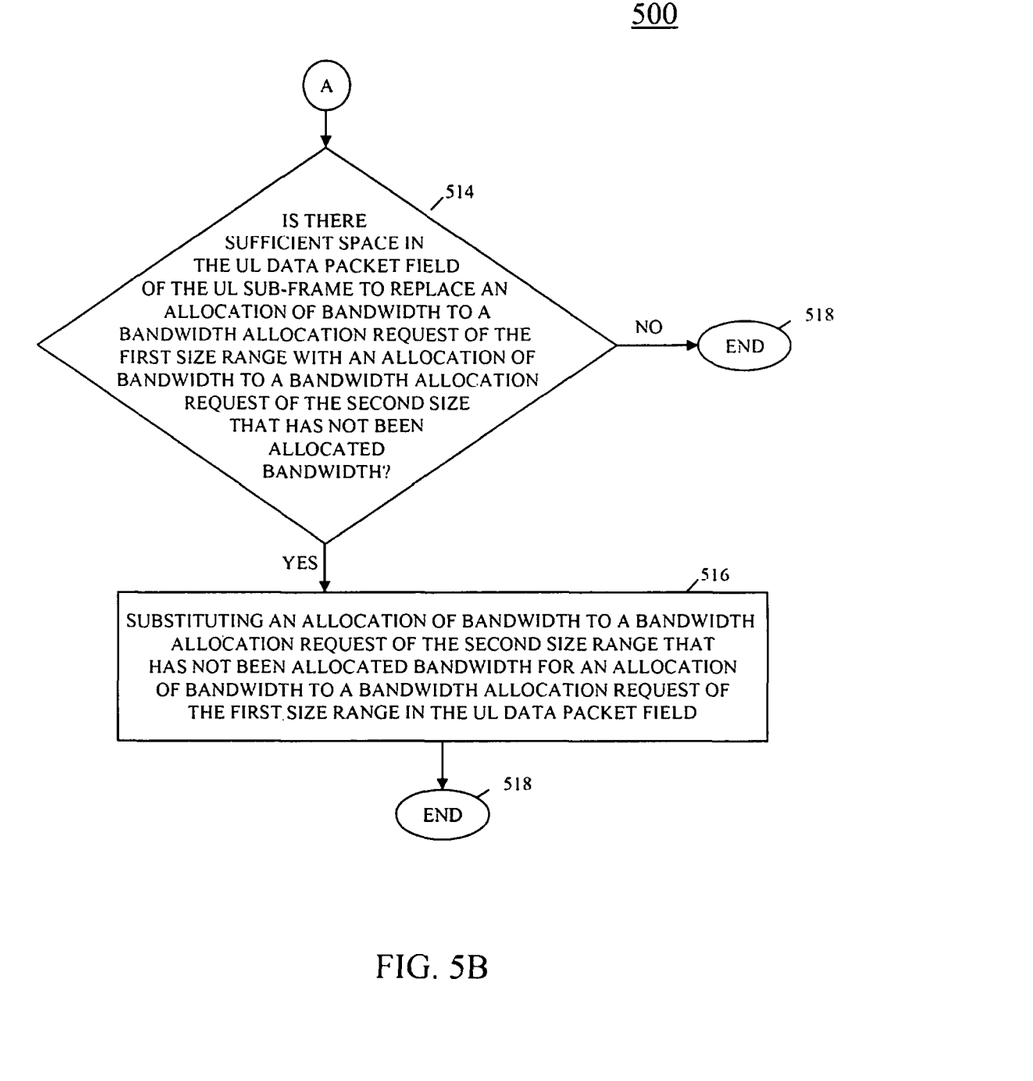
FIG. 5B is continuation of the logic flow diagram of FIG. 5A illustrating a method for uplink scheduling performed by the communication system of FIG. 2 in accordance with an embodiment of the present invention.

Referring now to FIGS. 5A and 5B, a logic flow diagram 500 is provided that illustrates a method for uplink scheduling of MSs by a serving RAN, that is, RAN 220 and in particular scheduler 222, in accordance with an embodiment of the present invention. Logic flow diagram 500 begins (502) when each MS of the multiple MSs 201-214 conveys to scheduler 222, and the scheduler receives (504) from each such MS and stores in at least one memory device 404, a request for a bandwidth allocation, that is, a request to be allocated bandwidth in an UL data packet field of a subsequent UL sub-frame, wherein the bandwidth allocation requests include one or more requests to be allocated bandwidth of a first size range, such as a request to be allocated bandwidth less than 10 bytes, and one or more requests to be allocated bandwidth of a second size range, wherein each bandwidth allocation request of the second size range requests more bandwidth than any bandwidth allocation request of the first size range. For example, in a WiMAX communication system, a request for a bandwidth allocation may be a Ranging Code and symbol used by an MS to anonymously request bandwidth for a subsequent conveyance of a Bandwidth Request Header, may be a Bandwidth Request Header that requests bandwidth for a subsequent conveyance of user data, or may be an infrastructure-based or MS-based application requesting bandwidth for a conveyance of control data, such as polling data. Other applications or functions that may submit a request for a bandwidth allocation may occur to one of ordinary skill in the art, and any such application or other function may be applicable here as long as one or more of the applications and/or functions submits a request for to be allocated more bandwidth in an UP sub-frame than is requested by another application or function.

In response to receiving the requests, scheduler 222 sorts (506) the requests in order of priority. Scheduler 222 then allocates (508) bandwidth to the requests in order of sorted priority, highest priority first. When enough allocations are made such that a maximum size of UL-MAP is reached, scheduler 222 determines (510) whether the bandwidth allocations will fill the UL data packet field of a subsequent UL sub-frame and further determines (512) whether any bandwidth allocation requests of the second size range remain unallocated. If the bandwidth allocations will fill the UL data packet field of the subsequent UL sub-frame or no bandwidth allocation requests of the second size range remain unallocated, then logic flow diagram 500 ends (518).

If the bandwidth allocations will not fill the UL data packet field of the subsequent UL sub-frame and one or more bandwidth allocation requests of the second size range remain unallocated, then scheduler 222 determines (514) whether there is sufficient space in the UL data packet field of the UL sub-frame to replace an allocation of bandwidth to a bandwidth allocation request of the first size range with an allocation of bandwidth to a bandwidth allocation request of the second size range that has not been allocated bandwidth in the UL sub-frame. If there is not sufficient space, then logic flow diagram 500 ends (518). If there is sufficient space to substitute bandwidth allocations, then scheduler 222 substitutes (516) an allocation of bandwidth to a highest priority bandwidth allocation request of the second size range that has not been allocated bandwidth in the UL sub-frame, for an allocation of bandwidth to a bandwidth allocation request of the first size range. This allocation need not be a full allocation provided that fragmentation is allowed for the connection of the second group being scheduled, and that sufficient space exists to allocate a minimum sized allocation. Logic flow diagram 500 then may return to step 510 and the process may continue until no further bandwidth allocation requests of the second size range remain unallocated or until the UL data packet field of the UL sub-frame does not have sufficient unallocated space to accommodate a next highest priority bandwidth allocation request of the second size range.

Figure 6:
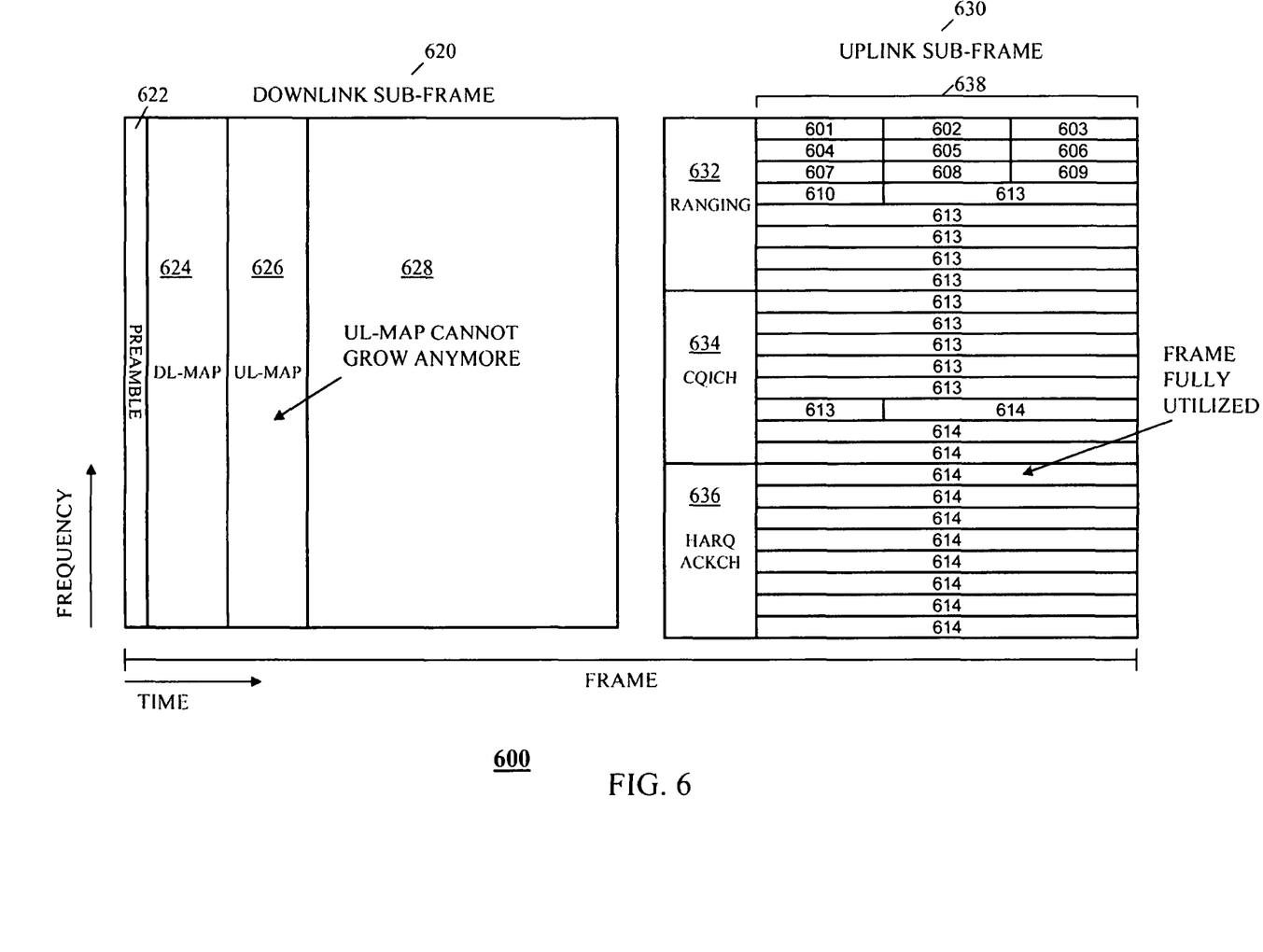
FIG. 6 is a block diagram of an exemplary WiMAX frame in accordance with an embodiment of the present invention.

For example, FIG. 6 is a block diagram of an exemplary frame 600, and in particular a WiMAX frame, in accordance with an embodiment of the present invention. As depicted in FIG. 6 and similar to frame 100, frame 600 comprises a downlink (DL) sub-frame 62 that is sent by a RAN 220 to users, such as MSs 201-214, served by the RAN and an uplink (UL) sub-frame 630 that is sent by the users to the RAN.

DL sub-frame 620 includes a DL scheduling field (DL-MAP) 624, an UL scheduling field (UL-MAP) 626, and a DL data packet field 628. DL sub-frame 620 further may include a preamble field 622. DL-MAP 624 provides a frame duration, a frame number, a DL sub-band allocation for DL bursts, and a coding and modulation scheme used for each DL burst. UL-MAP 626 provides UL sub-band scheduling for UL bursts by served mobile stations (MSs), a coding and modulation scheme used for each UL burst, and a start time for each UL burst. DL data packet field 628 comprises the DL bursts, that is, is the field in which the RAN transmits data packets to the served MSs based on the sub-band scheduling. Preamble field 622 typically comprises pilots that may be used by MSs for timing synchronization, frequency synchronization, and channel estimation.

UL sub-frame 630 includes a control region comprising a Ranging Code field 632, a channel quality information (CQI) feedback field 634 (that is, CQI channels (CQICH)), and a Hybrid Automatic Repeat reQuest (HARQ) acknowledgement field 636 (that is, HARQ Acknowledgement channels (HARQ ACKCH)). UL sub-frame 630 further comprises an UL data packet field 638. UL data packet field 638 comprises UL bursts, that is, is the field in which the MSs transmit data packets to the RAN based on UL-MAP 626. A location of an MS's data packet in UL data packet field 638, that is, the sub-bands(s) (sub-carriers and times) used by the MS to transmit data, is determined by the assignment received by the MS in UL-MAP 626.

For purposes of illustrating the principles of the present invention and not intended to limit the invention in any way, it is assumed herein that MSs 201-212 requested a bandwidth allocation of the first size range and that MSs 213 and 214 requested a bandwidth allocation of the second size range. Further, it is assumed herein that, when sorted in priority of their requests, the requests of MSs 201-212 were of a higher priority, or at least a same priority, as the requests of MSs 213 and 214. Under the prior art, UL-MAP 626 would fill up with bandwidth allocations to MSs 201-212, and the sub-band allocations of UL data packet field 638 would look the same as UL data packet field 138 of frame 100.

However, under the method described in logic flow diagram 500, scheduler 222 determines that, after allocations are made to MSs 201-212 (wherein bandwidth allocated to each of MSs 201-214 in UL data packet field 638 is represented by a corresponding reference number 601-614) resulting in a maximum size of UL-MAP 626 being reached, the bandwidth allocations will not fill UL data packet field 638 of a subsequent UL sub-frame 630. Scheduler 222 further determines that one or more bandwidth allocation requests of the second size range (that is, the requests of MSs 213 and 214) remain unallocated. In addition, scheduler 222 determines that there is sufficient space in UL data packet field 638 to replace a lowest priority bandwidth allocation to a bandwidth allocation of the first size range that has been allocated bandwidth in the UL sub-frame, for example, the allocation made to MS 212, with an allocation of bandwidth to a highest priority bandwidth allocation request of the second size range that has not been allocated bandwidth in the UL sub-frame, for example, the bandwidth allocation request of MS 213. Scheduler 222 then replaces the lowest priority bandwidth allocation to a bandwidth allocation request of the first size range that has been allocated bandwidth in the UL sub-frame 638, that is, the allocation to MS 212, with the highest priority bandwidth allocation request of the second size range that has not been allocated bandwidth in the UL sub-frame, that is, the request of MS 213.

After substituting the allocation of bandwidth of MS 213 for the allocation of bandwidth to MS 212, scheduler 222 again determines that the bandwidth allocations will not fill UL data packet field 638 and that one or more bandwidth allocation requests of the second size range (that is, the request of MS 214) remain unallocated. Scheduler 222 further determines that there is sufficient space in UL data packet field 638 to replace a next lowest priority allocation of bandwidth to a bandwidth allocation request of the first size range, for example, the allocation made to MS 211, with an allocation of bandwidth to a next highest priority bandwidth allocation request of the second size range that has not been allocated bandwidth in the UL sub-frame, for example, the bandwidth allocation request of MS 214. Scheduler 222 then replaces the bandwidth allocation to MS 211 in the UL sub-frame 638 with an allocation of bandwidth to MS 214. Scheduler 222 then determines that UL data packet field 638 is full.

Thus, by reconfiguring a full UL-MAP when an UL data packet field has unassigned sub-bands available, which reconfiguration involves substituting highest priority, large size, unallocated bandwidth requests for lowest priority, small size, allocated bandwidth requests, scheduler 222 assures a fuller utilization of an UL data packet field of a UL sub-frame that is being scheduled.

Figure 7:
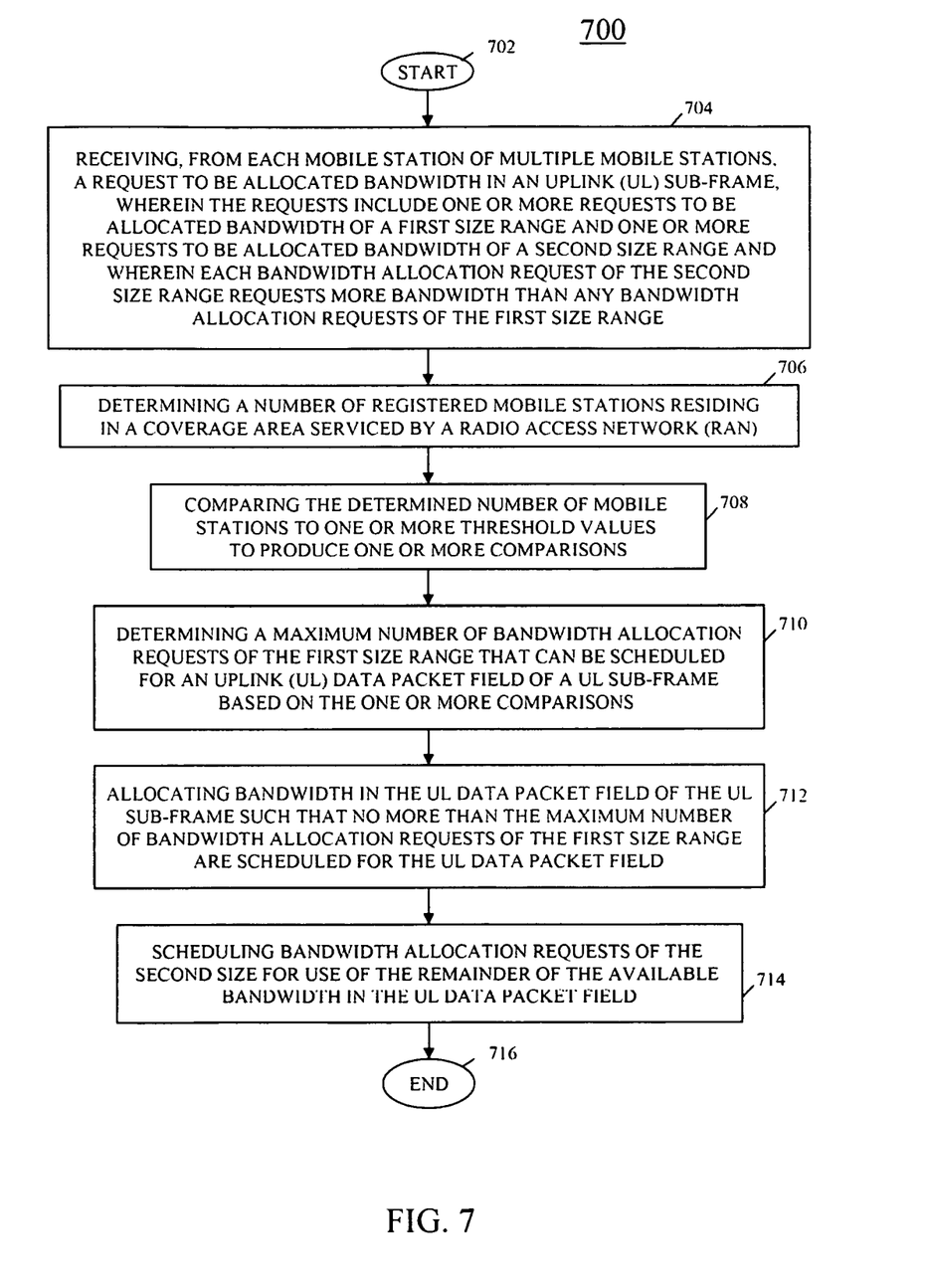
FIG. 7 is a logic flow diagram illustrating a method for uplink scheduling performed by the communication system of FIG. 2 in accordance with another embodiment of the present invention.

In another embodiment of the present invention, instead of going through the iterative process described with respect to logic flow diagram 500, scheduler 222 may utilize a lookup table in determining whether to substitute one or more requests for an bandwidth allocation of the second size range for one or more allocations of bandwidth to bandwidth allocation requests of the first size range when allocating bandwidth in a UL data packet field of a UL sub-frame. Referring now to FIG. 7, a logic flow diagram 700 is provided of a method for uplink scheduling of MSs by a serving RAN, that is, RAN 220 and in particular scheduler 222, in accordance with a 'lookup table' embodiment of the present invention. Similar to logic flow diagram 500, logic flow diagram 700 begins (702) when each MS of the multiple MSs 201-214 conveys to scheduler 222, and the scheduler receives (704) from each such MS and stores in at least one memory device 404, a request for a bandwidth allocation, that is, a request to be allocated bandwidth, in an UL data packet field of a subsequent UL sub-frame, wherein the bandwidth allocation requests include one or more requests to be allocated bandwidth of a first size range, such as a request to be allocated bandwidth anywhere in a range of less than 10 bytes, and one or more requests to be allocated bandwidth of a second size range, wherein each bandwidth allocation request of the second size range requests more bandwidth than any bandwidth allocation request of the first size range.

In response to receiving the multiple requests for a bandwidth allocation, scheduler 222 determines (706) a number of registered MSs residing in a coverage area serviced by RAN 220, such as a cell or a sector that is serviced by the RAN. Scheduler 222 then compares (708) the determined number of MSs to one or more threshold values to produce one or more comparisons. Based on the one or more comparisons, scheduler 222 determines (710) a maximum number of bandwidth allocation requests of the first size range that can be allocated bandwidth in a UL data packet field of a subsequent UL sub-frame. Scheduler 222 then schedules (712) bandwidth in a UL data packet field of a subsequent UL sub-frame accordingly, such that no more than the maximum number of bandwidth allocation requests of the first size range are scheduled for the UL data packet field of the UL sub-frame. Scheduler 222 schedules (714) bandwidth allocation requests of the second size range for use of the remainder of the available bandwidth in the UL data packet field of the UL sub-frame, and logic flow 700 then ends (716). If scheduler 222 fully allocates all bandwidth allocation requests in the second size range, and there remains available bandwidth in the UL data packet field of the UL sub-frame, and there also remains additional outstanding bandwidth allocation requests in the first size range, the scheduler will resume scheduling the additional outstanding bandwidth allocation requests in the first size range until these allocations are fully allocated, or there is no available bandwidth in the UL data packet field of the UL sub-frame, or there is no available bandwidth in the UL-MAP size.

The threshold values are maintained in table 406 of at least one memory device 404 of scheduler 222. Table 406 further maintains, in association with each threshold value of the one or more threshold values, which threshold values each corresponds to a predetermined number of registered MSs in a coverage area, a maximum number of bandwidth allocation requests of the first size range that can be scheduled for a scheduling time period. When a number of registered MSs exceeds a given threshold value, then the number of bandwidth allocations that may be scheduled at any particular time for bandwidth allocation requests of the first size range prior to an attempt to schedule the second size range is limited to the corresponding maximum number associated with that threshold value. The table may include multiple such threshold values, wherein the larger the threshold value, the lower the maximum number of bandwidth allocation requests of the first size range that may be scheduled for an UL data packet field. In other words, as the number of registered MSs residing in a coverage area increases, the scheduler may be limited to fewer bandwidth allocations to bandwidth allocation requests of the first size range. The particular threshold values employed, and the maximum number of bandwidth allocations to bandwidth allocation requests of the first size range corresponding to each threshold value, are up to a designer of communication system 200 and are not critical to the present invention.

For example and referring now to FIGS. 6 and 7, scheduler 222 may determine, by reference to table 406 and based on a number of registered MSs residing in a coverage area serviced by RAN 220, that a maximum of ten bandwidth allocation requests of the first size range can be allocated bandwidth in a UL data packet field 638. As a result, scheduler 222 allocates sub-bands in UL data packet field 638 to MSs 201-210 and skips over the requests of MSs 211 and 212 (wherein each of MSs 201-212 requested an bandwidth allocation of the first size range), instead allocating the remaining sub-bands available in UL data packet field 638 to MSs 213 and 214 (wherein each of MSs 213 and 214 requested an bandwidth allocation of the second size range).

By employing these threshold values and limiting a number of possible small bandwidth allocations when increasing numbers of MSs are being served, communication system 200 better assures a fuller utilization of an UL data packet field of a UL sub-frame that is being scheduled. Thus, by implementing such bandwidth reservations, or by substituting an allocation of bandwidth to an unallocated bandwidth allocation request of the second size range for an allocation of bandwidth to a bandwidth allocation request of the first size range when the allocated bandwidth does not fill the UL data packet field and one or more bandwidth allocation requests of the second size range remains unallocated, communication system 200 more fully utilizes a UL data packet field of a UL sub-frame than is provided in the prior art.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions.

What is claimed is:

1. A method for uplink scheduling in an Orthogonal Frequency Division Multiplexing communication system, the method comprising:

receiving, from each mobile station of a plurality of mobile stations, a request for an allocation of bandwidth, wherein the requests comprise one or more requests for a bandwidth allocation of a first size range and one or more requests for a bandwidth allocation of a second size range and wherein each bandwidth allocation request of the second size range requests more bandwidth than any bandwidth allocation request of the first size range;

allocating bandwidth in an uplink data packet field of an uplink sub-frame to the bandwidth allocation requests in order of priority; and when enough allocations are made such that a maximum size of the uplink packet data field is reached and when the allocated bandwidth does not fill the uplink data packet field and one or more bandwidth allocation requests of the second size range remains unallocated, substituting an allocation of bandwidth to an unallocated bandwidth allocation request of the second size range for an allocation of bandwidth to a bandwidth allocation request of the first size range in the uplink data packet field if there is sufficient space to substitute the bandwidth allocation.

2. The method of claim 1, wherein a bandwidth allocation request of the first size range is a request for an allocation of bandwidth of ten or fewer bytes.

3. The method of claim 1, wherein substituting comprises substituting an allocation of bandwidth to a highest priority, unallocated bandwidth allocation request of the second size range for an allocation of bandwidth to a lowest priority bandwidth allocation request of the first size range in the uplink data packet field.

4. The method of claim 3, further comprising, in response to substituting an allocation of bandwidth to a highest priority, unallocated bandwidth allocation request of the second size range for an allocation of bandwidth to a lowest priority bandwidth allocation request of the first size range in the uplink data packet field:

determining that the allocated bandwidth still does not fill the uplink data packet field;

determining that one or more bandwidth allocation requests of the second size range remains unallocated; and substituting an allocation of bandwidth to a next highest priority, unallocated bandwidth allocation request of the second size range for an allocation of bandwidth to a next lowest priority bandwidth allocation request of the first size range in the uplink data packet field.

5. A scheduler operable in an Orthogonal Frequency Division Multiplexing communication system, the scheduler comprising:

an at least one memory device;

a processor that is configured to receive, from each mobile station of a plurality of mobile stations, and store in the at least one memory device, a request for an allocation of bandwidth, wherein the requests comprise one or more requests for a bandwidth allocation of a first size range and one or more requests for a bandwidth allocation of a second size range and wherein each bandwidth allocation request of the second size range requests more bandwidth than any bandwidth allocation request of the first size range, allocate bandwidth in an uplink data packet field of an uplink sub-frame to the bandwidth allocation requests in order of priority, and when enough allocations are made such that a maximum size of the uplink packet data field is reached and when the allocated bandwidth does not fill the uplink data packet field and one or more bandwidth allocation requests of the second size range remains unallocated, substitute an allocation of bandwidth to an unallocated bandwidth allocation request of the second size range for an allocation of bandwidth to a bandwidth allocation request of the first size range in the uplink data packet field if there is sufficient space to substitute the bandwidth allocation.

6. The scheduler of claim 5, wherein a bandwidth allocation request of the first size range is a request for an allocation of bandwidth often or fewer bytes.

7. The scheduler of claim 5, wherein the processor is configured to substitute allocations of bandwidth by substituting an allocation of bandwidth to a highest priority, unallocated bandwidth allocation request of the second size range for an allocation of bandwidth to a lowest priority bandwidth allocation request of the first size range in the uplink data packet field.

8. The scheduler of claim 7, wherein the processor is configured to, in response to substituting an allocation of bandwidth to a highest priority, unallocated bandwidth allocation request of the second size range for an allocation of bandwidth to a lowest priority bandwidth allocation request of the first size range in the uplink data packet field:
- determine that the allocated bandwidth still does not fill the uplink data packet field;
- determine that one or more bandwidth allocation requests of the second size range remains unallocated; and
- substitute an allocation of bandwidth to a next highest priority, unallocated bandwidth allocation request of the second size range for an allocation of bandwidth to a next lowest priority bandwidth allocation request of the first size range in the uplink data packet field.

\* \* \* \* \*